US012600256B2

(12) United States Patent
Tsimhoni et al.

(10) Patent No.: US 12,600,256 B2
(45) Date of Patent: Apr. 14, 2026

(54) CHARGING CUE SYSTEM FOR A VEHICLE

(71) Applicant: GM Global Technology Operations LLC, Detroit, MI (US)

(72) Inventors: Omer Tsimhoni, Bloomfield Hills, MI (US); Frank C. Valeri, Novi, MI (US); Song He, Troy, MI (US); Ravid Erez, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 18/661,550

(22) Filed: May 10, 2024

(65) Prior Publication Data

US 2025/0346140 A1 Nov. 13, 2025

(51) Int. Cl.
*B60L 53/62* (2019.01)
*B60L 53/66* (2019.01)
*B60L 53/16* (2019.01)

(52) U.S. Cl.
CPC ............... B60L 53/62 (2019.02); B60L 53/66 (2019.02); *B60L 53/16* (2019.02); *B60L 2250/10* (2013.01)

(58) Field of Classification Search
CPC .......... B60L 53/62; B60L 53/66; B60L 53/16; B60L 2250/10
USPC ........................................................ 340/445
See application file for complete search history.

(56) References Cited

U.S. PATENT DOCUMENTS

| | | | | |
|---|---|---|---|---|
| 10,787,087 | B2 * | 9/2020 | Connolly | .............. B60L 3/0023 |
| 11,945,329 | B2 * | 4/2024 | Shpati | ...................... B60Q 1/50 |
| 2016/0068101 | A1 * | 3/2016 | Holloway | .............. G10K 15/02 |
| | | | | 701/36 |
| 2019/0312447 | A1 * | 10/2019 | Werner | .................. G01R 31/36 |

FOREIGN PATENT DOCUMENTS

| | | | |
|---|---|---|---|
| DE | 112017005871 | T5 | 8/2019 |
| DE | 102023113063 | A1 | 11/2024 |
| GB | 2513394 | A | 10/2014 |
| WO | WO-2018091456 | A1 * | 5/2018 ............ B60L 53/665 |

* cited by examiner

*Primary Examiner* — Eric Blount
(74) *Attorney, Agent, or Firm* — Honigman LLP; Matthew H. Szalach; Jonathan P. O'Brien

(57) ABSTRACT

A charging cue system for a vehicle includes a battery including a battery controller storing battery data and a speaker system. The charging cue system also includes an electronic control unit (ECU) that is communicatively coupled with the battery controller and the speaker system. The ECU includes data processing hardware that is configured with an audible cue application and memory hardware that stores charging parameters. The audible cue application includes an audible progress monitor that is configured as a function of the charging parameters and configured to project at least one cue at the speaker system in response to the battery data.

20 Claims, 7 Drawing Sheets

CHARGING CUE SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a charging cue system for a vehicle.

Electric vehicles (EV) operate through charging at various charging facilities. For example, users may charge the EV at a home charger or may utilize public chargers. Often, the user does not receive feedback as to whether a charging connection was established between the selected public charger and the vehicle. Further, the user may not receive feedback regarding the level and status of the charging process. Thus, there is a need to improve the feedback with respect to charging process and progress both with respect to public and private charging facilities.

SUMMARY

In some aspects, a charging cue system for a vehicle includes a battery including a battery controller storing battery data and a charging port including a sensor. The sensor is configured to capture connection data at the charging port. The charging cue system also includes a speaker system and an electronic control unit (ECU) that is communicatively coupled with each of the battery controller, the charging port, and the speaker system. The ECU includes data processing hardware that is configured with an audible cue application and memory hardware that stores charging parameters based on the battery data and the connection data. The audible cue application includes an audible progress monitor configured as a function of the charging parameters and configured to project at least one cue at the speaker system in response to the charging parameters.

In some examples, the charging parameters may include at least one of a connection status, an authorization status, and a charge status. A proximity sensor may be coupled to a body of the vehicle and may be configured to gather proximity data. The proximity sensor may be communicatively coupled with the ECU and the audible cue application may be configured to project the at least one cue in response to the proximity data and the connection status. Optionally, the audible progress monitor may include cue characteristics including at least one of volume, tone, pitch, and frequency. In some instances, the audible progress monitor may be configured to alter one or more of the cue characteristics in response to one or more of the charging parameters. In some configurations, the charging cue system may include a user device in communication with the ECU and including a mobile wallet. The mobile wallet may include the audible cue application. Optionally, the charging parameters may include a target charge level and the audible progress monitor may be configured to issue the at least one cue in response to a charge status of the battery corresponding to the charge level.

In other aspects, a charging cue system for a vehicle includes a battery including a battery controller storing battery data and a speaker system. The charging cue system also includes an electronic control unit (ECU) that is communicatively coupled with the battery controller and the speaker system. The ECU includes data processing hardware that is configured with an audible cue application and memory hardware that stores charging parameters. The audible cue application includes an audible progress monitor that is configured as a function of the charging parameters and configured to project at least one cue at the speaker system in response to the battery data.

In some examples, the charging parameters may include at least one of a connection status, an authorization status, and a charge status. A proximity sensor may be coupled to a body of the vehicle and being configured to gather proximity data. The proximity sensor may be communicatively coupled with the ECU and the audible cue application may be configured to project the at least one cue in response to the proximity data and the connection status. Optionally, the audible progress monitor may include cue characteristics including at least one of volume, tone, pitch, and frequency. In some instances, the audible progress monitor may be configured to alter one or more of the cue characteristics in response to one or more of the charging parameters. In some configurations, a user device may be in communication with the ECU and may include a mobile wallet. The mobile wallet may include the audible cue application. Optionally, the charging parameters may include a target charge level and the audible progress monitor may be configured to issue the at least one cue in response to a charge status of the battery corresponding to the charge level.

In further aspects, a computer-implemented method when executed by data processing hardware causes the data processing hardware to perform operations. The operations include detecting, via a charging sensor, connection of a charger at a charging port of a vehicle, activating, via an electronic control unit (ECU), an audible cue application in response to the detected connection, and executing, in response to the activated audible cue application, an audible progress monitor. The operations also include issuing a connection cue of the executed audible progress monitor, monitoring, via the audible cue application, charging parameters of the vehicle, and updating the audible progress monitor, via cue projections, based on charging parameters.

In some examples, the cue projections may be a function of the charging parameters. Optionally, updating the audible progress monitor may include issuing a charge cue based on a charge status of the charging parameters. In some instances, updating the audible progress monitor may include issuing at least one cue at one or more of a speaker system of the vehicle and a user device.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
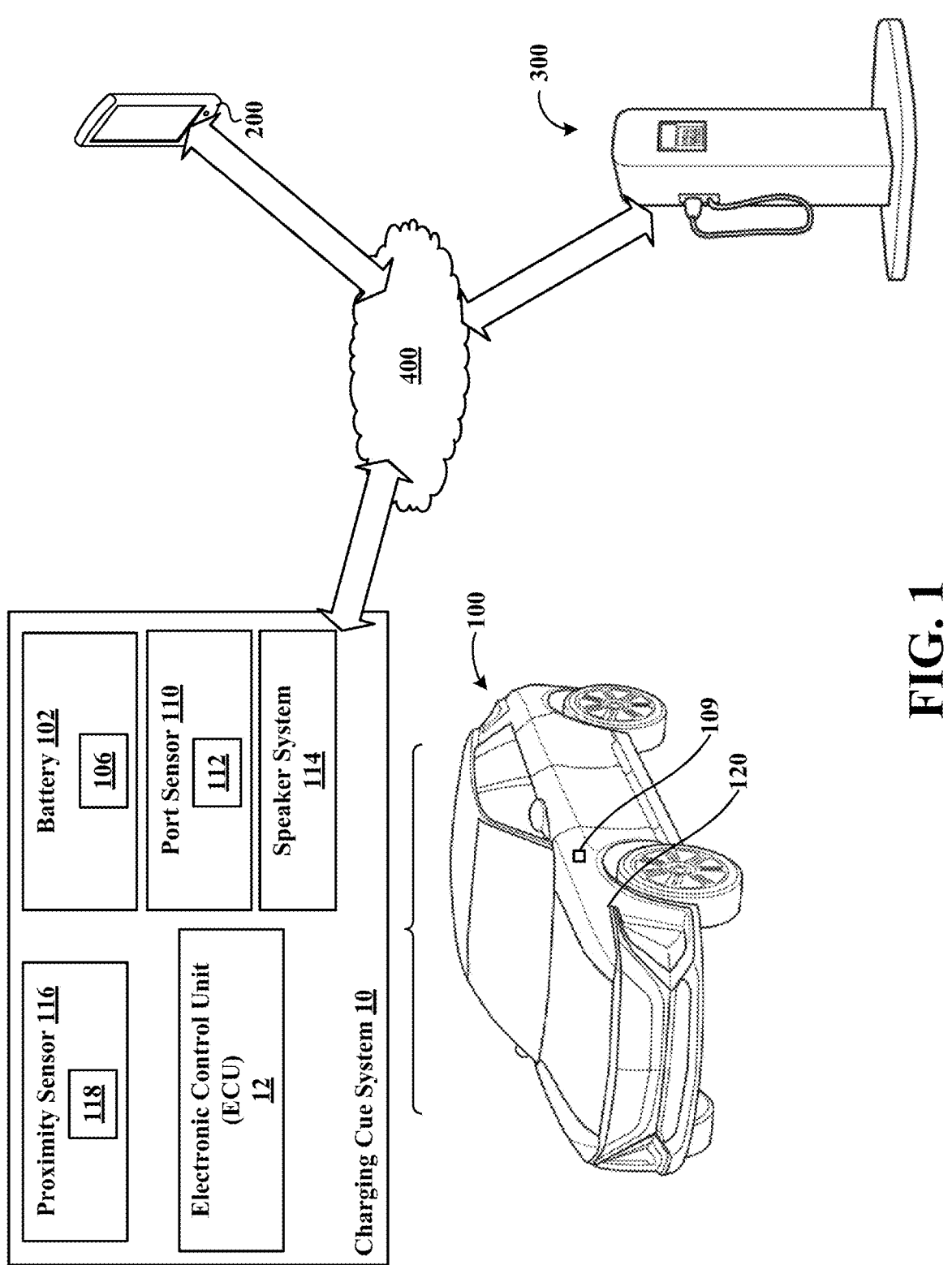
FIG. 1 is a schematic of a charging cue system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
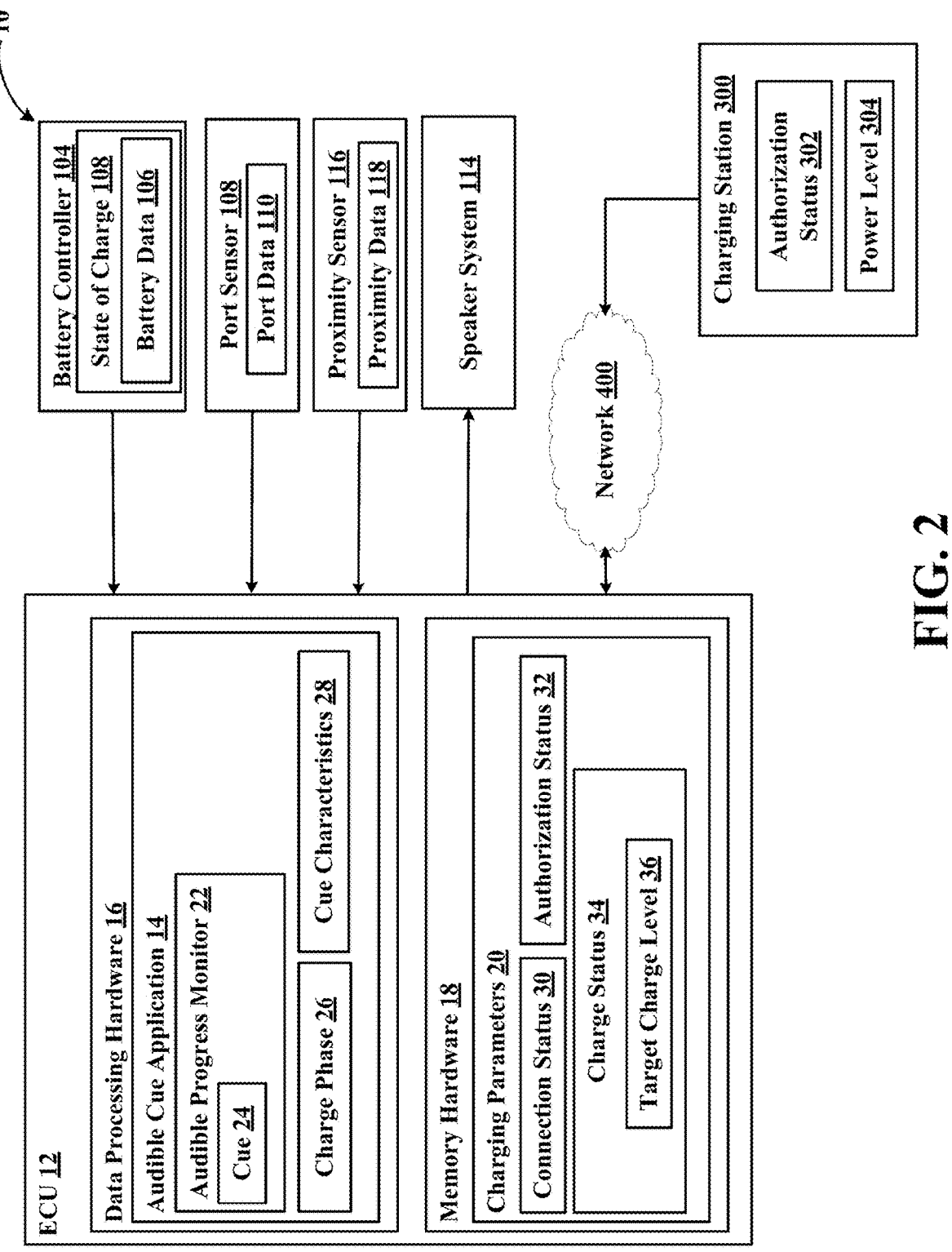
FIG. 2 is an exemplary block diagram of a charging cue system according to the present disclosure including an electronic control unit (ECU), a battery controller, a port sensor, a proximity sensor, a speaker system, and a charging station communicatively coupled via a network.
Figure 3:
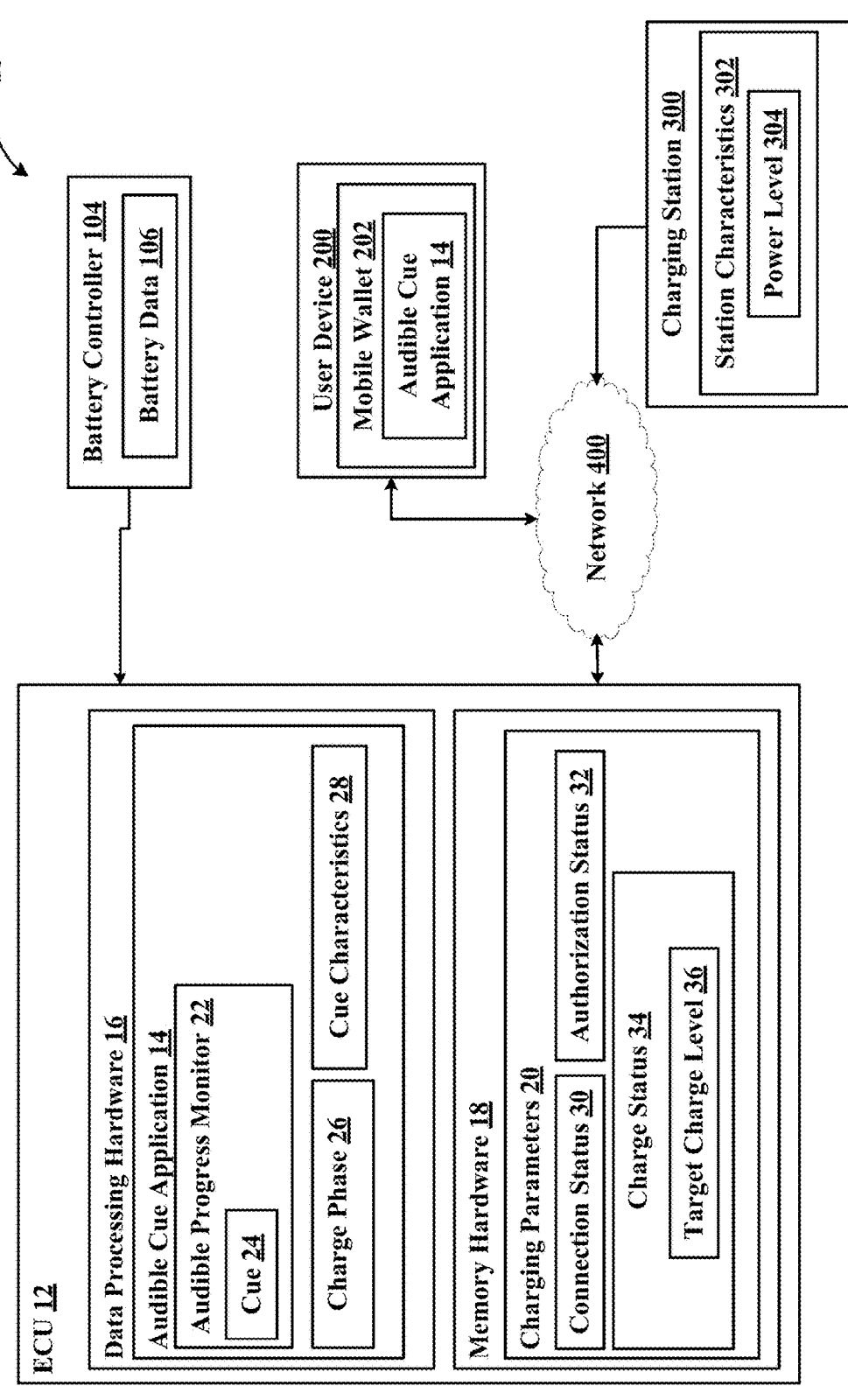
FIG. 3 is another exemplary block diagram of a charging cue system according to the present disclosure including communication between an ECU, a charging station, and a user device.

Referring to FIGS. 1-3, a charging cue system 10 for a vehicle 100 includes an electronic control unit (ECU) 12 configured with an audible cue application 14. In some examples, the audible cue application 14 may be configured as part of a user device 200 that is communicatively coupled with the vehicle 100 and may be part of the charging cue system 10. The charging cue system 10 is configured to interconnect the vehicle 100 and the user device 200 with a charging station 300. The ECU 12 of the vehicle 100 may be communicatively coupled with the user device 200 and charging station(s) 300 via a network 400. The charging cue system 10 is configured to audibly assist the user in monitoring the various stages and progress associated with the charging of the vehicle 100. Accordingly, the vehicle 100 is contemplated to be an electric vehicle (EV) 100 including a battery 102. However, the audible cue application 14 described herein may be modified to be used with an internal combustion engine (ICE) vehicle 100 and/or a hybrid vehicle 100.

The battery 102 includes a battery controller 104 that gathers battery data 106. The battery data 106 is communicated with the ECU 12 as part of the charging cue system 10. For example, the battery data 106 may inform a state of charge 108 and may generally inform the audible cue application 14 as to the degree or level of charge desired to achieve an optimal battery performance, as described herein. The vehicle 100 also includes a charging port 109 equipped with a port sensor 110 configured to gather port data 112 that is also communicated with the ECU 12 as part of the charging cue system 10, described herein. The ECU 12 receives the battery data 106 and the port data 112 and updates the charging parameters 20 accordingly.

With further reference to FIGS. 1-3, the ECU 12 includes data processing hardware 16 configured to execute the audible cue application 14 and memory hardware 18 storing charging parameters 20 of the charging cue system 10. The memory hardware 18 communicates with the data processing hardware 16, such that the audible cue application 14 utilizes the charging parameters 20 stored by the memory hardware 18 during operation. For example, the audible cue application 14 includes an audible progress monitor 22 that is executed by the charging cue system 10 as a function of the charging parameters 20. The audible progress monitor 22 is designed to provide a user with audible updates regarding the state of charge 108 of the battery 102. The charging parameters 20 are used to update the audible progress monitor 22 via a cue 24 that is projected through a speaker system 114 of the vehicle 100 and/or the user device 200.

For example, the speaker system 114 may be configured within an interior cabin of the vehicle 100 as well as exterior to the vehicle 100. In some examples, the audible progress monitor 22 may be projected via the speaker system 114 exterior to the vehicle 100, so the user may approach the vehicle 100 and hear an update of the audible progress monitor 22 based on the cue 24. In some instances, the vehicle 100 is further configured with a proximity sensor 116 that captures proximity data 118 relative to the vehicle 100. For example, the proximity sensor 116 is disposed along a body 120 of the vehicle 100. The proximity data 118 captured by the proximity sensor 116 informs the charging cue system 10 of whether the user is approaching or nearby the vehicle 100. The detection of the user proximate to the vehicle 100 may trigger the charging cue system 10 to activate the audible progress monitor 22 to project the cue 24. Thus, the audible progress monitor 22 may selectively execute the cue 24 based on the proximity data 118. The cue 24 may represent a charge phase 26 determined by the charging parameters 20.

The audible cue application 14 receives the charging parameters 20 from the memory hardware 18 to update the audible progress monitor 22 to reflect the charge phase 26. The charge phase 26 is relative to the execution of charging the battery 102. Comparatively, the charging parameters 20 includes status checks in addition to the charging execution. For example, the charging parameters 20 reflect various stages of connecting with the charging station 300 and executing the charge process. The charging parameters 20 are configured to correspond with cues 24 issued by the audible progress monitor 22, such that the cues 24 reflect a different parameter of the charging parameters 20. For example, the cues 24 as issued by the audible progress monitor 22 may have different cue characteristics 28 set by the audible cue application 14. In some instances, the user may customize the cue characteristics 28 to correspond to one or more of the charging parameters 20. The cue characteristics 28 include, but are not limited to, volume, tone, pitch, and frequency. In some instances, the audible progress monitor 22 is configured to alter one or more of the cue characteristics 28 in response to one or more of the charging parameters 20. The cue 24 is designed to be a pleasant sound that is emitted by the speaker system 114 of the vehicle 100 and/or projected via the user device 200.

The cue characteristics 28 may be adjusted or otherwise altered by the user to customize the cue 24. For example, the user may customize the cue 24 to have a first cue characteristic 28 during a first charge phase 26 and a second cue characteristic 28 during a second charge phase 26. As charging of the battery 102 progresses, the frequency 28 of the cue 24 emitted by the audible progress monitor 22 may increase. The increase in frequency of the cue 24 indicates that the charge phase 26 is progressing and nearing completion. It is also contemplated that the audible progress monitor 22 may issue multiple, different cues 24 throughout the duration of charge corresponding to the different charging parameters 20.

Figure 4:
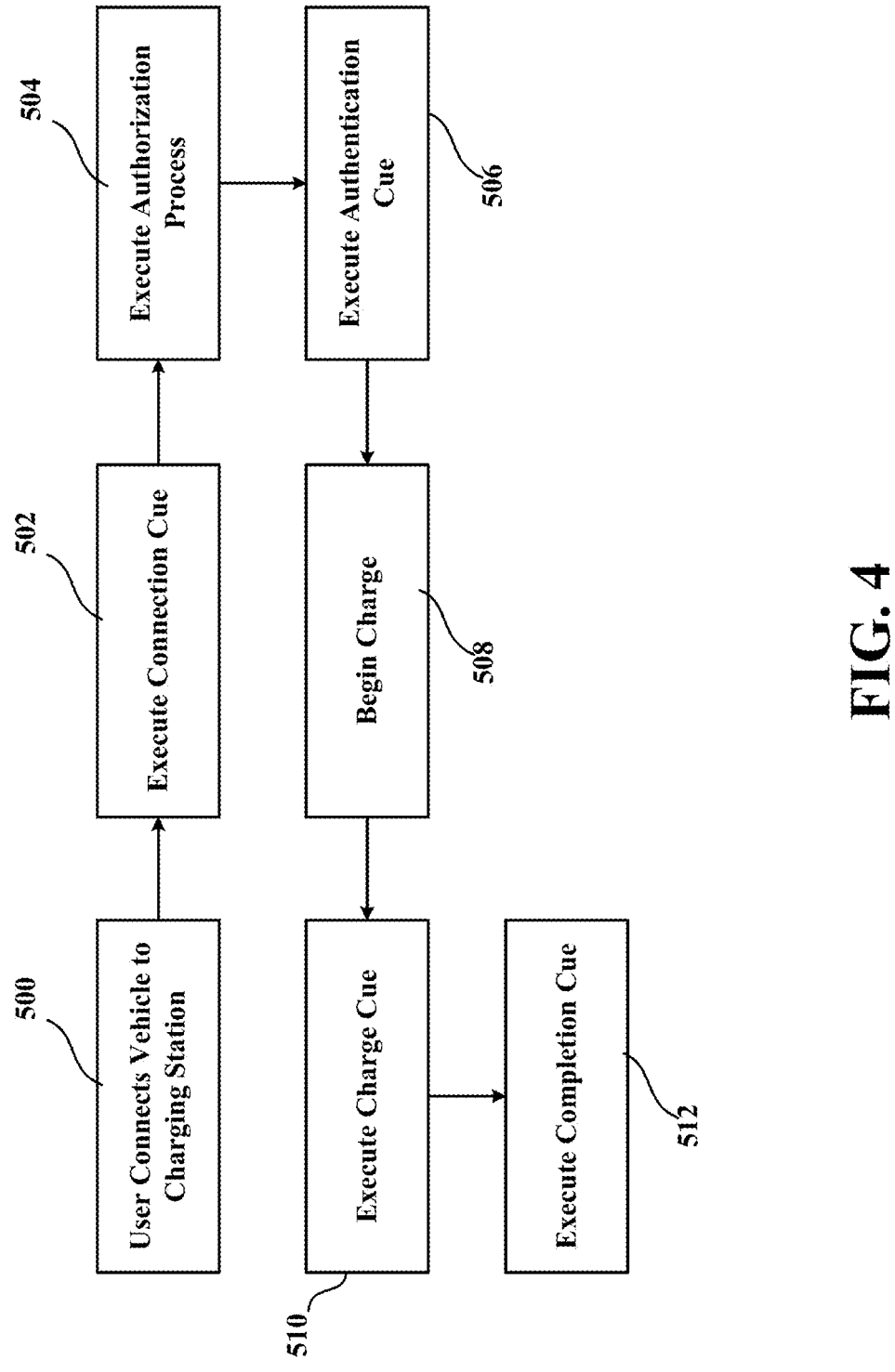
FIG. 4 is an exemplary flow diagram of a charging cue system according to the present disclosure.

Referring to FIGS. 2-4, the charging parameters 20 include a connection status 30, an authorization status 32, a charge status 34, and in some examples, a payment status. The charging parameters 20 are defined by one or more of the battery data 106 and the port data 112. For example, when the port sensor 110 detects that the vehicle 100 is connected to a charging station 300, the connection status 30 is updated with the port data 112, and the audible progress monitor 22 may issue a cue 24 with cue characteristics 28 corresponding to the connection status 30 of the vehicle 100 and charging station 300. The charging cue system 10 may subsequently receive an authentication notice from the charging station 300 to inform the authorization status 32 of the charging parameters 20. For example, the charging station 300 may be a plug-and-charge station in which the charge phase 26 is initiated once the vehicle 100 authorizes the charging station 300. Once the vehicle 100 has authenticated the charging station 300, the authorization status 32 is updated, which is indicated by a cue of the audible progress monitor 22, and the charge phase 26 may begin. Thus, the audible progress monitor 22 may provide the user with audible updates by projecting the cue 24 in response to each of the connection status 30 and the authorization status 32.

Figure 5:
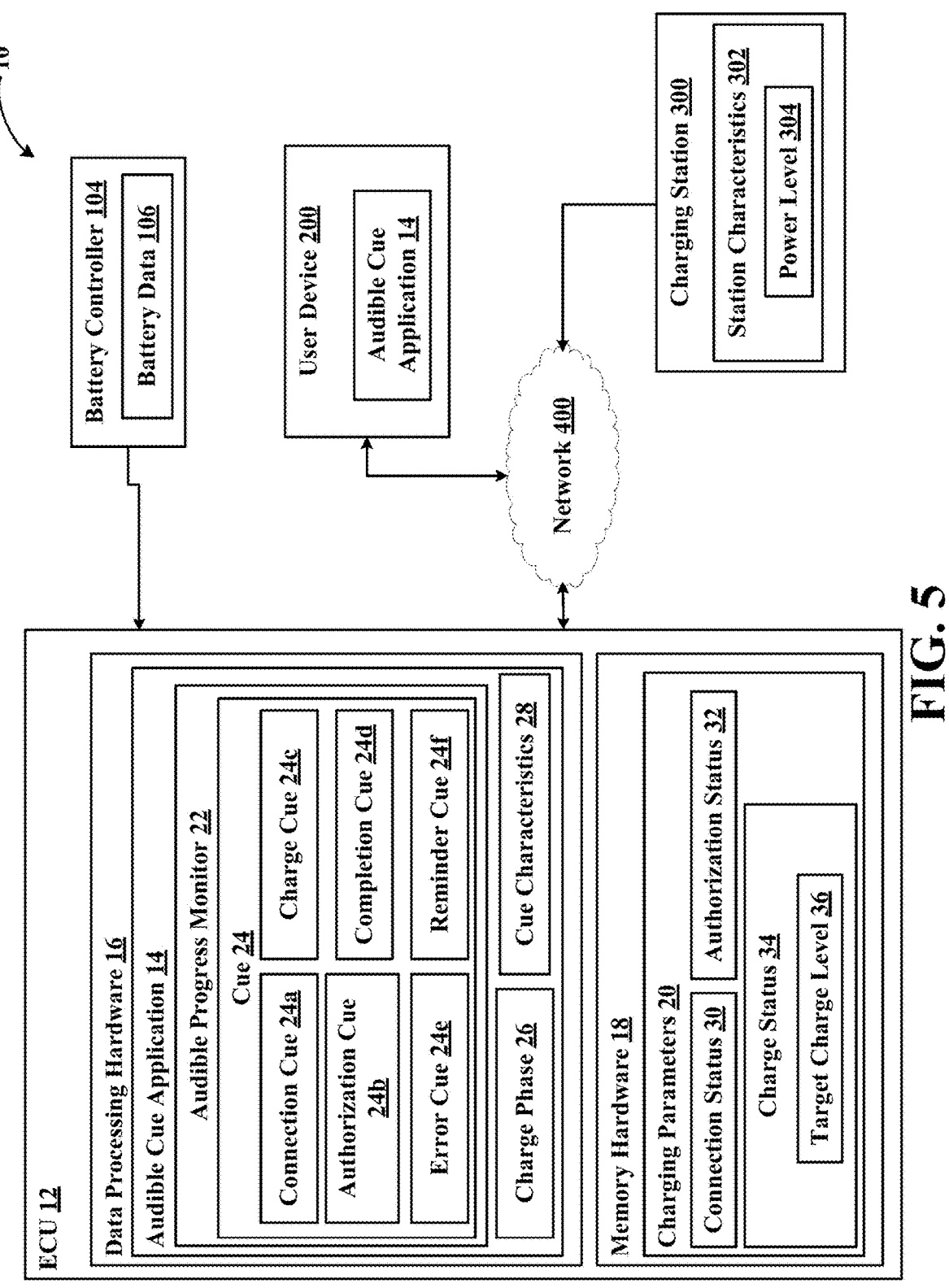
FIG. 5 is another exemplary block diagram of a charging cue system according to the present disclosure including different cues of an audible progress monitor.

FIG. 4 illustrates one example flow diagram of the audible progress monitor 22. At 500, the user connects the vehicle 100 with the charging station 300 and, in response, the audible progress monitor 22 issues, at 502, a connection cue 24*a* (FIG. 5). The vehicle 100 then authenticates, at 504, the charging station 300 to authorize charging of the battery 102. The audible progress monitor 22 may play a cue 24 while the user awaits authorization, so as to inform the user of the authorization status 32 being in progress. Once authorized, the audible progress monitor 22 executes, at 506, an authorization cue 24*b* indicating that the charging station 300 has been authorized and charging may begin, at 508.

The audible progress monitor 22 may continuously issue, at 510, a charge cue 24*c* throughout the charge phase 26 to reflect the charge status 34. In other examples, the audible progress monitor 22 may issue the charge cue 24*c* in response to the proximity data 118. For example, the audible cue application 14 may receive the proximity data 118 captured by the proximity sensor 116 indicating that the user is nearby or proximal to the vehicle 100. Thus, the proximity sensor 116 is communicatively coupled with the ECU 12, and the audible cue application 14 is configured to project the cue 24 in response to the proximity data 118 and the connection status 30. In response, the audible progress monitor 22 may issue the cue 24 to reflect the charge phase 26 and corresponding charge status 34. Once the charge phase is complete, the audible progress monitor 22 may issue, at 512, a completion cue 24*d*.

Accordingly, the audible progress monitor 22 may issue a cue 24 based on the connection status 30 and may issue a subsequent cue 24 in response to the authorization status 32 being confirmed. As mentioned above, the audible progress monitor 22 may alter the cue characteristics 28 based on the charging parameters 20 in that the charging parameters 20 generally correspond with the charge phase 26. Thus, each charging parameter 20 may be associated with different cue characteristics 28, which may be set by the user or programmed as part of the audible cue application 14.

In some examples, the charging parameters 20 may include a target charge level 36 stored as part of the charge status 34. For example, the target charge level 36 may correspond to a battery percentage that is less than a complete charge or charge to one-hundred (100) percent or a full charge. The target charge level 36 may be set and adjusted by the user to a desired level. In some instances, the user may desire to have the battery 102 charged to the full charge to minimize stopping along a route. In other instances, the user may desire to have the charging process stop at a percentage less than the full charge to optimize the operable life of the battery 102. The target charge level 36 may be set and adjusted by the user via the audible cue application 14, which is communicatively coupled with the charging parameters 20.

As mentioned above, the audible progress monitor 22 provides a cue 24 associated with the charge status 34 and may adjust the cue characteristics 28 based on the charge status 34. In some instances, the charge may be interrupted or stopped by the user. For example, the user may disconnect the vehicle 100 from the charging station 300 before reaching the target charge level 36 or full charge. In response, the audible progress monitor 22 may then issue a cue 24 with a different cue characteristic 28 to notify the user of the interrupted charge status 34. The user may reconnect the vehicle 100 or may disregard the cue 24 if the interruption was intentional. In some instances, the vehicle 100 may be unintentionally disconnected from the charging station 300 and, thus, the cue 24 may alert the user of the interruption to the charge phase 26. If the vehicle 100 completes the charge, then the audible progress monitor 22 issues a cue 24 corresponding to completion of the charge phase 26. As generally mentioned above, the cues 24 associated with the charge phase(s) 26 are customizable by the user, so the user can identify the charge phase 26 based on the cue 24 issued by the audible progress monitor 22.

Further, different charging parameters 20 may be configured and associated with different cues 24 having different cue characteristics 28. For example, the cue characteristics 28 of the cue 24 associated with the connection status 30 may be different from the cue characteristics 28 of the cue 24 associated with the charge status 34. The customization of the cues 24 with the respective charging parameters 20 further assists the user in utilizing audio signals to monitor the progress of the charge. The audible progress monitor 22 advantageously assists the user in monitoring the charge phase 26 while being free to leave the vehicle 100 or perform alternate functions while waiting for the charge to be complete. Instead, the user is able to listen for the respective cue 24 to inform the user as to the charge phase 26 via the audible progress monitor 22.

Referring to FIGS. 2-5, the audible progress monitor 22 may be configured as issuing a single cue 24 that has altered cue characteristics 28 based on the charge phase 26. For example, the volume 28 of the cue 24 may increase as the charge phase 26 progresses. In other examples, the audible progress monitor 22 may issue multiple cues 24 each with different cue characteristics 28 corresponding to different phases of the charge phase 26, as generally mentioned above. For example, each cue 24 may have a different pitch 28 to reflect a different phase of the charge phase 26. The user may identify the charge status 34 based on the audible progress monitor 22 and respective cue 24.

Referring again to FIGS. 4 and 5, the operative function of the charging cue system 10 may include various stages or phases associated with the charging parameters 20, as set forth above, and which inform the audible progress monitor 22. For example, when the user attaches the vehicle 100 to the charging station 300, the audible progress monitor 22 may issue a cue 24 indicating whether the vehicle 100 is properly attached to the charging station 300. If the vehicle 100 is properly connected, the audible progress monitor 22 may issue the connection cue 24a, and if there is an error in the connection between the vehicle 100 and the charging station 300, then the audible progress monitor 22 may issue an error cue 24e distinct from the connection cue 24a. Thus, the user may be alerted to adjust or check the connection between the vehicle 100 and the charging station 300 via the audible, error cue 24e.

Further, the vehicle 100 may utilize an authorization step to verify the charging station 300. The audible progress monitor 22 may play the authorization cue 24b corresponding to the authentication process and issue the authorization cue 24b in response to the authorization status 32 being confirmed. The authorization cue 24b provides the user with feedback of the progress of the ongoing authentication task and indicates that the user should wait until the authorization status 32 has been confirmed. Once the authorization status 32 is confirmed, the charge status 34 may be updated to project or execute the charge cue 24c corresponding to the charge phase 26.

Thus, the charging cue system 10 may issue the connection cue 24a via the audible progress monitor 22 that corresponds to a confirmation of the connection status 30. The charging cue system 10 then may coordinate with the charging station 300 via the network 400 to authorize the vehicle 100 with the charging station 300, reflected by the authorization status 32. The authorization status 32 may also reflect a potential payment between the user (i.e., via the user device 200 or other payment method) and the charging station 300. During the authorization process, the audible progress monitor 22 may play a pleasant, looping cue 24 to indicate that the charging cue system 10 is in the process of authorization. Once authenticated, the audible progress monitor 22 may issue the authorization cue 24b corresponding to the positive authentication and the charge cue 24c corresponding to the initiation of the charge phase 26.

The charge cue 24c may have successive phases associated with the charge phase 26, such that the cue characteristics 28 of may change to reflect a new charge phase 26. The audible progress monitor 22 may issue the completion cue 24d once the battery data 106 reflects that a charge corresponding to the target charge level 36. The charge cue 24c may be updated or modified throughout the charge phase 26 by modifying or altering the cue characteristics 28, as mentioned above. The changes to the cue characteristics 28 provide an audible update for the user as to the progress and status of the charge. In some instances, the charge cue 24c is configured to reflect the charge phase 26 and station characteristics 302. The station characteristics 302 may include, for example, a power level 304 of the charging station 300. The power level 304 may reflect a quality and type of charge provided by the charging station 300. In some examples, the quality of charge may correspond with the duration of time it takes the charging station 300 to complete a charge and the type of charge may reflect whether the charging station 300 is configured as a fast charger.

The cue 24, based on the cue characteristic 28, may provide the user with feedback with respect to the power level 304 and may also inform the user of any potential errors associated with the charging station 300. Further, the user may approach the vehicle 100 while the vehicle 100 is connected to the charging station 300, and the audible cue application 14 may trigger the audible progress monitor 22 to project or otherwise issue the cue 24 based on the proximity data 118. The issued cue 24 may reflect the station characteristics 302 by having altered cue characteristics 28.

Once the charging is complete, the audible progress monitor 22 issues the completion cue 24d that may have a different cue characteristic 28 indicating that charge phase 26 is complete, as mentioned above. In the event that the user has set a target charge level 36, the audible progress monitor 22 may issue the completion cue 24d once the battery 102 is charged to the target charge level 36. The audible cue application 14 may also issue a reminder, via a reminder cue 24f, that the target charge level 36 is less than a full charge.

Referring again to FIGS. 3-5, the user device 200 may be equipped with the audible cue application 14. For example, the user device 200 may include a mobile wallet 202 that is configured with the audible cue application 14. The mobile wallet 202 may be utilized to operate or otherwise navigate operational aspects of the vehicle 100. The audible cue application 14, as part of the mobile wallet 202, assists the user with the ability to have the audible progress monitor 22 projected via the user device 200 while the user may be away from the vehicle 100. For example, the user may connect the vehicle 100 to the charging station 300 and leave the vehicle 100 at the charging station 300 while the user performs other activities. The audible cue application 14 equipped on the user device 200 may assist the user in monitoring the progress of the charge of the vehicle 100 via the audible progress monitor 22 projecting the cue 24 via the user device 200.

Thus, the user can advantageously monitor the charge phase 26 while away from the vehicle 100. Further, the audible progress monitor 22 assists in providing updates to the user via the audible cues 24, such that the user is free from otherwise monitoring the user device 200 for visual cues or updates that may be associated with other applications. In some examples, the user may manually set the cue characteristics 28 for various cues 24 associated with different charge phases 26. By manually setting the cue characteristics 28 based on a respective charge phase 26, the user may utilize the audible progress monitor 22 to audibly track the charge phase 26 via the audible cues 24.

Figure 6:
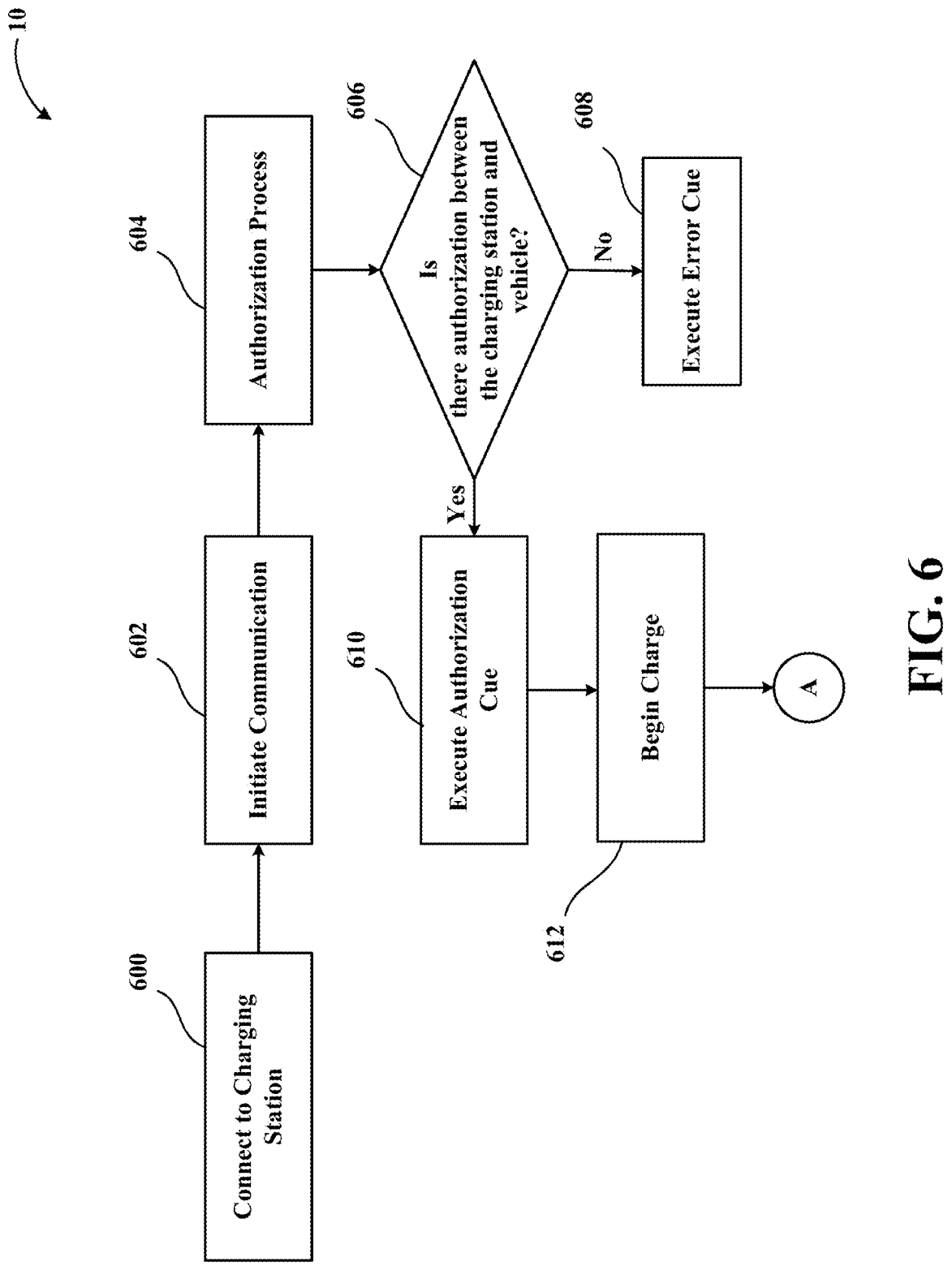
FIG. 6 is another exemplary flow diagram of a charging cue system according to the present disclosure.
Figure 7:
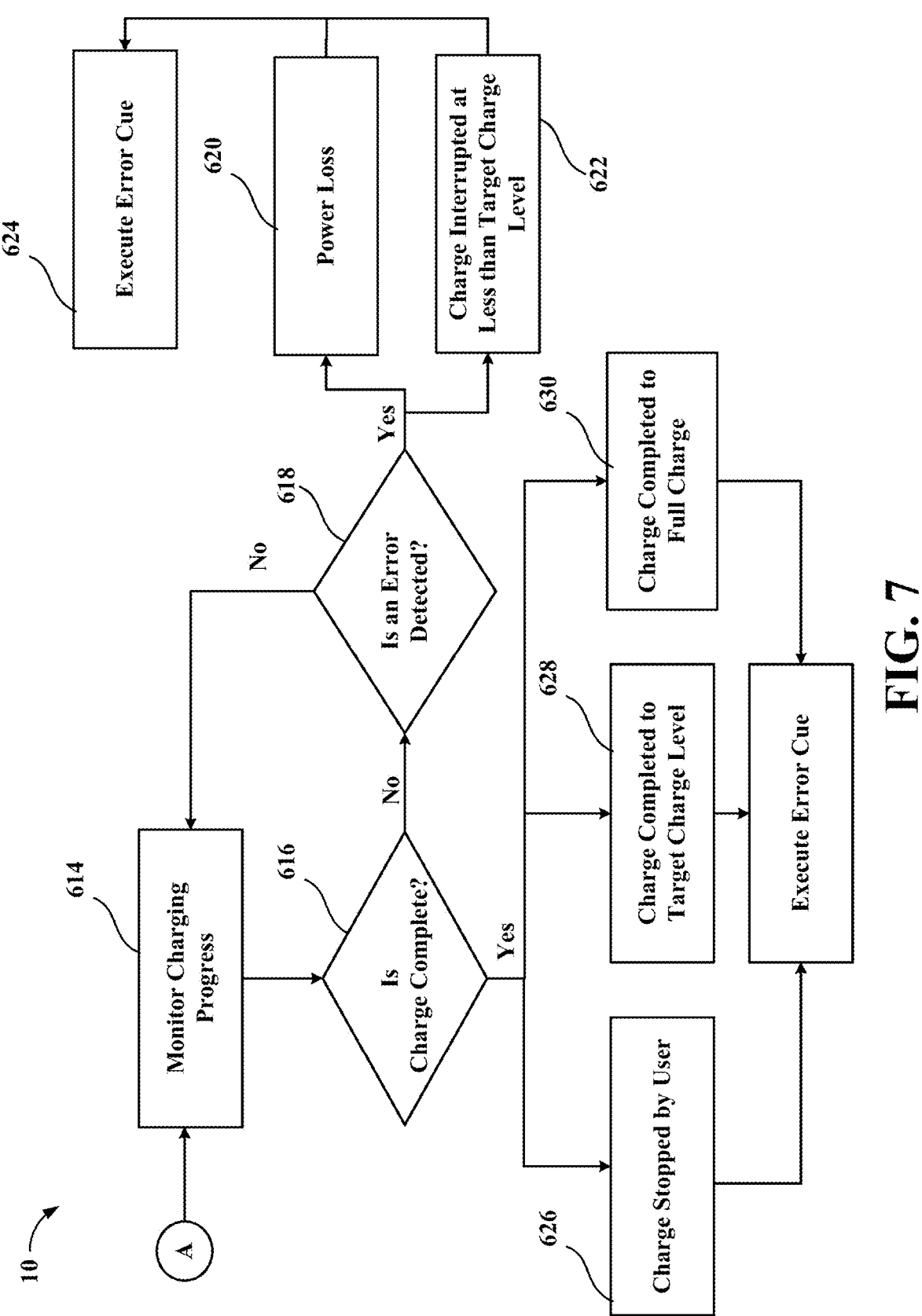
FIG. 7 is a continued flow diagram of the charging cue system of FIG. 6.

Referring now to FIGS. 6 and 7, an exemplary flow diagram of the charging cue system 10. The charging cue system 10 is activated, at 600, by the vehicle 100 being connected to the charging station 300. Communication between the vehicle 100 and the charging station 300 is initiated, at 602, and the authorization process beings, at 604. The charging cue system 10 determines, at 606, whether there is authorization between the charging station 300 and the vehicle 100. If there is no authorization, then the charging cue system 10 executes, at 608, an error cue 24*e*. If there is an authorization, then the charging cue system 10 executes, at 610, the authorization cue 24*b* and, at 612, begins the charge.

The charging cue system 10, via the audible progress monitor 22, monitors, at 614, the charge progress and determines, at 616, whether the charge is complete. If the charge is not complete, the charging cue system 10 determines, at 618, whether an error is detected. If no error is detected, then the charging cue system 10 continues monitoring the charging progress. If an error is detected, the charging cue system determines, at 620 and 622, whether there was a power loss or if the charge was interrupted at less than the target charge level 36 and issues, at 624, an error cue 24*e*. If the charge is complete, the charging cue system 10 determines, at 626-630, whether the charge was stopped by a user, the charge completed to the target charge level 36, or the charge completed to a full charge and executes, at 632, the completion cue 26*d*.

Referring again to FIGS. 1-7, the charging cue system 10 is configured to assist the user in audibly monitoring the charge phase 26 and connection status 30 of the vehicle 100 relative to the charging station 300. By projecting the cues 24 of the audible progress monitor 22 via the speaker system 114, the user is able to audibly track the progress of each phase of connection, authorization, and charge of the vehicle 100. Thus, the audible progress monitor 22 provides a convenient process by which the user can continue with other activities while simultaneously monitoring the charge progress of the vehicle 100. Further, the incorporation of the audible progress monitor 22, via the audible cue application 14, as part of a mobile wallet 202 on the user device 200 maximizes the convenience associated with the audible tracking and monitoring of the charge phase 26.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A charging cue system for a vehicle, the charging cue system comprising:
   a battery including a battery controller storing battery data;
   a charging port including a sensor, the sensor being configured to capture connection data at the charging port;
   a speaker system; and
   an electronic control unit (ECU) communicatively coupled with each of the battery controller, the charging port, and the speaker system, the ECU including data processing hardware configured with an audible cue application and memory hardware storing charging parameters based on the battery data and the connection data, the audible cue application (A) including an audible progress monitor having cue characteristics comprising at least one of volume, tone, pitch, and frequency and (B) configured to (i) alter one or more of the cue characteristics in response to one or more of the charging parameters and (ii) project distinct cues at the speaker system that correspond with at least two of a connection status, an authorization status, a charge status, a completion status, and an error status.

2. The charging cue system of claim 1, further including a proximity sensor coupled to a body of the vehicle and being configured to gather proximity data.

3. The charging cue system of claim 2, wherein the proximity sensor is communicatively coupled with the ECU and the audible cue application is configured to project the distinct cues in response to the proximity data and the connection status.

4. The charging cue system of claim 1, further including a user device in communication with the ECU and including a mobile wallet, the mobile wallet including the audible cue application.

5. The charging cue system of claim 4, wherein the charging parameters include a target charge level and the audible progress monitor is configured to issue the distinct cues in response to a charge status of the battery corresponding to the charge level.

6. A charging cue system for a vehicle, the charging cue system comprising:
   a battery including a battery controller storing battery data;
   a speaker system; and
   an electronic control unit (ECU) communicatively coupled with the battery controller and the speaker system, the ECU including data processing hardware configured with an audible cue application and memory hardware storing charging parameters, the audible cue application (A) including an audible progress monitor having cue characteristics comprising at least one of volume, tone, pitch, and frequency and (B) configured to (i) alter one or more of the cue characteristics in response to one or more of the charging parameters and (ii) project distinct cues at the speaker system that correspond with at least two of a connection status, an authorization status, a charge status, a completion status, and an error status.

7. The charging cue system of claim 6, further including a proximity sensor coupled to a body of the vehicle and being configured to gather proximity data.

8. The charging cue system of claim 7, wherein the proximity sensor is communicatively coupled with the ECU and the audible cue application is configured to project the distinct cues in response to the proximity data and the connection status.

9. The charging cue system of claim 6, further including a user device in communication with the ECU and including a mobile wallet, the mobile wallet including the audible cue application.

10. The charging cue system of claim 9, wherein charging parameters include a target charge level and the audible progress monitor is configured to issue the distinct cues in response to a charge status of the battery corresponding to the charge level.

11. A computer-implemented method when executed by data processing hardware causes the data processing hardware to perform operations comprising:

detecting, via a charging sensor, connection of a charger at a charging port of a vehicle;

activating, via an electronic control unit (ECU), an audible cue application in response to the detected connection;

executing, in response to the activated audible cue application, an audible progress monitor that includes cue characteristics comprising at least one of volume, tone, pitch, and frequency;

receiving, at the ECU, battery data from a battery controller and connection data from the charging sensor;

determining and storing, in memory hardware of the ECU, charging parameters based on the battery data and the connection data;

issuing a connection cue of the executed audible progress monitor;

monitoring, via the audible cue application, charging parameters of the vehicle; updating the audible progress monitor based on the charging parameters; and issuing a cue distinct from the connection cue and corresponding to at least one of an authorization status and a charge status.

12. The method of claim 11, wherein updating the audible progress monitor includes issuing at least one cue at one or more of a speaker system of the vehicle and a user device.

13. The charging cue system of claim 1, wherein, upon detection of an error in a connection between the vehicle and a charging station, the audible progress monitor is configured to issue a cue corresponding to the error status that is distinct from a cue corresponding to the connection status.

14. The charging cue system of claim 1, wherein the charging parameters include a target charge level of the battery that is less than a full charge.

15. The charging cue system of claim 1, wherein the speaker system includes at least one exterior speaker that is configured to project the distinct cues external to the vehicle.

16. The charging cue system of claim 6, wherein, upon detection of an error in a connection between the vehicle and a charging station, the audible progress monitor is configured to issue a cue corresponding to the error status that is distinct from a cue corresponding to the connection status.

17. The charging cue system of claim 6, wherein the charging parameters include a target charge level of the battery that is less than a full charge.

18. The charging cue system of claim 6, wherein the speaker system includes at least one exterior speaker that is configured to project the distinct cues external to the vehicle.

19. The method of claim 11, wherein updating the audible progress monitor includes altering at least one cue characteristic selected from volume, tone, pitch, and frequency in response to at least one of the charging parameters.

20. The method of claim 11, further comprising receiving, at the ECU, proximity data from a proximity sensor coupled to a body of the vehicle, wherein updating the audible progress monitor includes issuing at least one cue in response to the proximity data and the connection data.

* * * * *